(No Model.)
J. E. FRIST.
VEHICLE WHEEL.
No. 504,340. Patented Sept. 5, 1893.
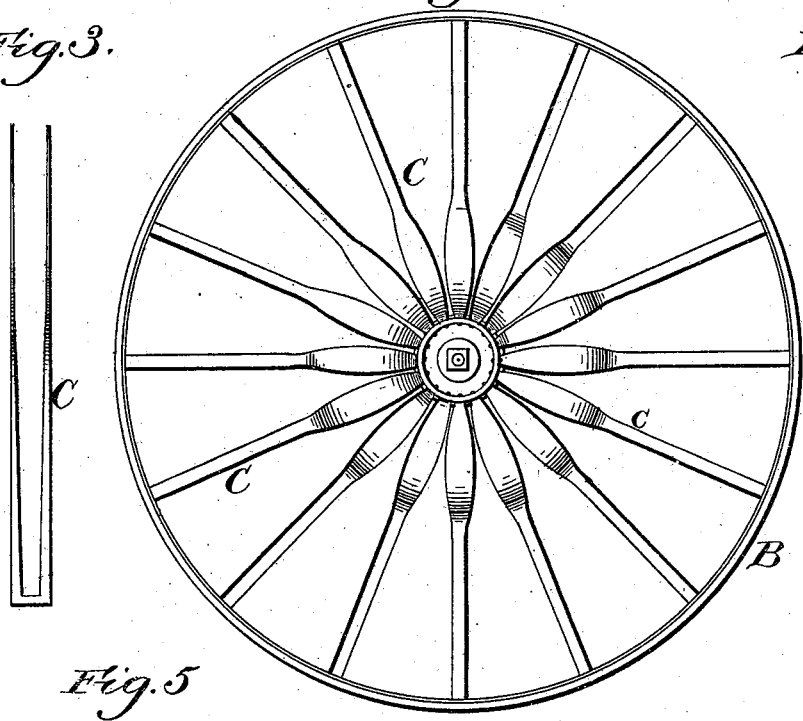
Fig. 1. Fig. 3. Fig. 4.
Fig. 5.
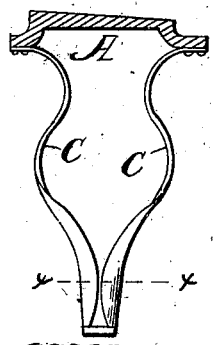
Fig. 7.
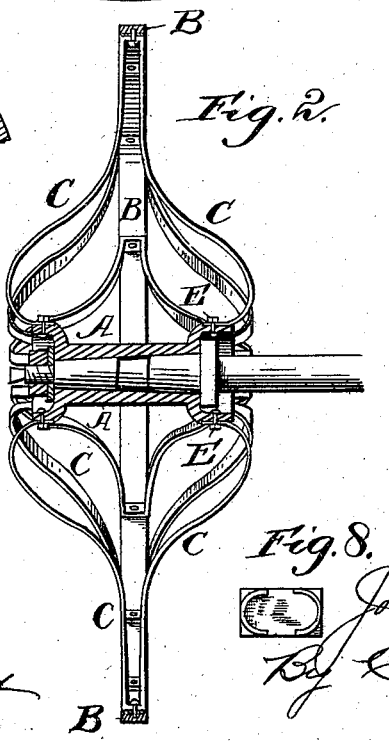
Fig. 2.
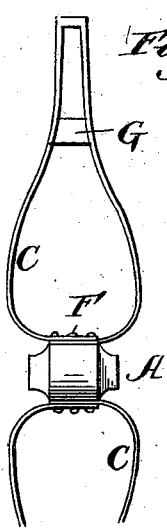
Fig. 6. Fig. 8.
Witnesses:
J. B. McGirr
Arthur L. Bryant
Inventor:
John E. Frist
By Eden Bros.
Attys.

UNITED STATES PATENT OFFICE.

JOHN E. FRIST, OF BALTIMORE, MARYLAND.

VEHICLE-WHEEL.

SPECIFICATION forming part of Letters Patent No. 504,340, dated September 5, 1893.

Application filed October 31, 1892. Serial No. 450,532. (No model.)

*To all whom it may concern:*

Be it known that I, JOHN E. FRIST, a citizen of the United States, residing at Baltimore, in the State of Maryland, have invented certain new and useful Improvements in Vehicle-Wheels; and I do hereby declare the following to be a full, clear, and exact description of the invention, such as will enable others skilled in the art to which it appertains to make and use the same.

My invention relates to improvements in vehicle wheels and the object is to provide a strong, durable and elastic wheel which will give or accommodate itself to rough roads and will take up the jar or motion commonly experienced when the wheels of a vehicle come in contact with an obstruction in the road.

With these ends in view my invention consists in a vehicle wheel comprising a hub, a rim and a series of duplex-spring spokes centrally attached to the rim and connected at their ends to the hub.

My invention further consists in the peculiar construction and arrangement of parts as will be hereinafter more fully pointed out and claimed.

In the accompanying drawings:—Figure 1 is a side elevation of my improved wheel. Fig. 2 is a sectional view of the same. Fig. 3 is a front view of one of the duplex spokes before it is secured in position on the wheel. Fig. 4 is a side view of the same. Fig. 5 is an enlarged detail sectional view of a portion of the hub. Figs. 6 and 7 are detail views of slightly modified constructions; and Fig. 8 is a sectional view on the line $x$—$x$ of Fig. 7.

Like letters of reference denote corresponding parts in all the figures of the drawings, referring to which—

A designates the hub and B the rim of a wheel constructed in accordance with my invention.

C designates the series of spokes which is composed of strong spring metal, preferably steel. These spokes are securely attached at their centers to the inner surface of the rim B and the ends thereof are attached to the hub A so that each spoke serves the purpose of two spokes in the ordinary construction of wheels.

The duplex spokes are preferably made in the forms shown in Figs. 3 and 4 by reference to which it will be seen that said spokes are reduced in width at their centers and for some distance on either side thereof and are widened or broadened near their ends, the ends being again reduced. The central reduced portions of the spokes are made somewhat thicker and stronger than the wider portions of the spokes as shown in Fig. 3. The ends of the spokes are shown as fitting in dovetailed grooves or seats D formed in the hub and opening through the ends thereof; and said spokes are firmly attached to the hub by means of suitable securing bolts E. The length of the spokes C from the center thereof to either end is somewhat greater than the radius of the wheel in which they are secured so that when they are placed in position the thin wider portions thereof will be bowed or curved first outwardly and then inwardly to fit into the seats D in the hub as shown in Fig. 2. Instead of attaching the ends of the duplex spokes to the hub A in the manner hereinbefore described such ends may be lapped one upon the other and the lapped ends attached to the outer surface of the hub by suitable bolts F, as shown in Fig. 6.

In Figs. 7 and 8 I have illustrated a slight modification of my improved duplex spoke in which the ends are attached to the hub, near the ends thereof, in any suitable manner, after which each half of the spoke is first bowed or curved inwardly and then outwardly and finally extended parallel for a short distance before being attached to the rim B.

In using my improved duplex spring spoke on light vehicles I prefer, instead of making such spoke thicker toward the center, as shown in Fig. 3, to make such spoke of the same thickness throughout its length and to bend the body thereof upon itself, slightly from near its center beyond the curved or bowed portion thereof to the outer end as shown in Fig. 8. In some cases I place between the members or sides of the spoke elastic cushions or pads G which strengthen the spoke. Such a pad is preferably arranged between the members at the point where they begin to bow or curve outwardly as shown in Fig. 6.

A wheel provided with spring spokes as herein shown and described possesses many advantages over the ordinary wheel in which rigid spokes are employed. Among the advantages may be mentioned the following: Such a wheel renders the vehicle easier of draft, is more elastic and accommodates itself to any roughness in the surface of the road. The spring spokes yield both laterally and vertically when the wheel comes in contact with obstructions and the jar and jolting motion commonly experienced in riding over rough roads in vehicles, the wheels of which are provided with rigid spokes, are avoided.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of the same. For instance, although I have herein shown and described my improved vehicle wheel as provided with duplex spokes centrally connected to the rim and having their ends attached to the hub near the opposite ends thereof I may in some cases employ single spokes attached at their ends to the rim and hub and of such length that when placed in position in the wheel they will be provided at intermediate points of their length with a bowed or curved portion whereby the wheel can yield both laterally and vertically as hereinbefore described.

Having thus fully described my invention, what I claim as new, and desire to secure by Letters Patent, is—

1. A vehicle wheel consisting of a hub, a rim, and a series of spokes attached to the rim and bowed or curved outwardly beyond the ends of the hub as they approach the same, said spokes having their inner ends bent inwardly and extending parallel with the cylindrical surface of the hub to which they are rigidly fastened, substantially as described.

2. A vehicle wheel consisting of a hub provided at its ends with a series of sockets which extend longitudinally of the hub, a rim, and a series of spokes attached to the rim and bowed or curved outwardly beyond the ends of the hub as they approach the same, said spokes having their inner ends bent inwardly and fitted in the sockets in the hub to which they are rigidly attached, substantially as described.

3. In a vehicle wheel, the combination of a hub, a rim, a series of duplex spring spokes centrally attached to the rim and having their ends attached to the hub and elastic blocks or pads arranged between the members of said spokes, substantially as described.

In testimony whereof I affix my signature in presence of two witnesses.

JOHN E. FRIST.

Witnesses:
W. CLARENCE DUVALL,
ARTHUR L. BRYANT.